Oct. 20, 1931.    G. C. MARSH    1,828,229
FEEDING MOLTEN GLASS
Filed July 18, 1928    2 Sheets-Sheet 1

INVENTOR
Gilbert C. Marsh
BY
Clarence Kerr
ATTORNEY

Oct. 20, 1931.   G. C. MARSH   1,828,229
FEEDING MOLTEN GLASS
Filed July 18, 1928   2 Sheets-Sheet 2

Patented Oct. 20, 1931

1,828,229

UNITED STATES PATENT OFFICE

GILBERT C. MARSH, OF AKRON, OHIO, ASSIGNOR TO HARTFORD-EMPIRE COMPANY, OF HARTFORD, CONNECTICUT, A CORPORATION OF DELAWARE

FEEDING MOLTEN GLASS

Application filed July 18, 1928. Serial No. 293,679.

My invention relates to the feeding of glass from a molten body of glass, and is partly directed to eliminating shear marks and the like from the gobs as they are cut and fed down into a machine for forming glass articles. My invention is also of especial importance in the manufacture of multi-colored glass balls or marbles in which it assists in giving the balls or marbles the desired striping from the different colors of glass of which the glass being fed is composed. My invention also comprises various features which I shall hereinafter describe and claim.

Figure 1:
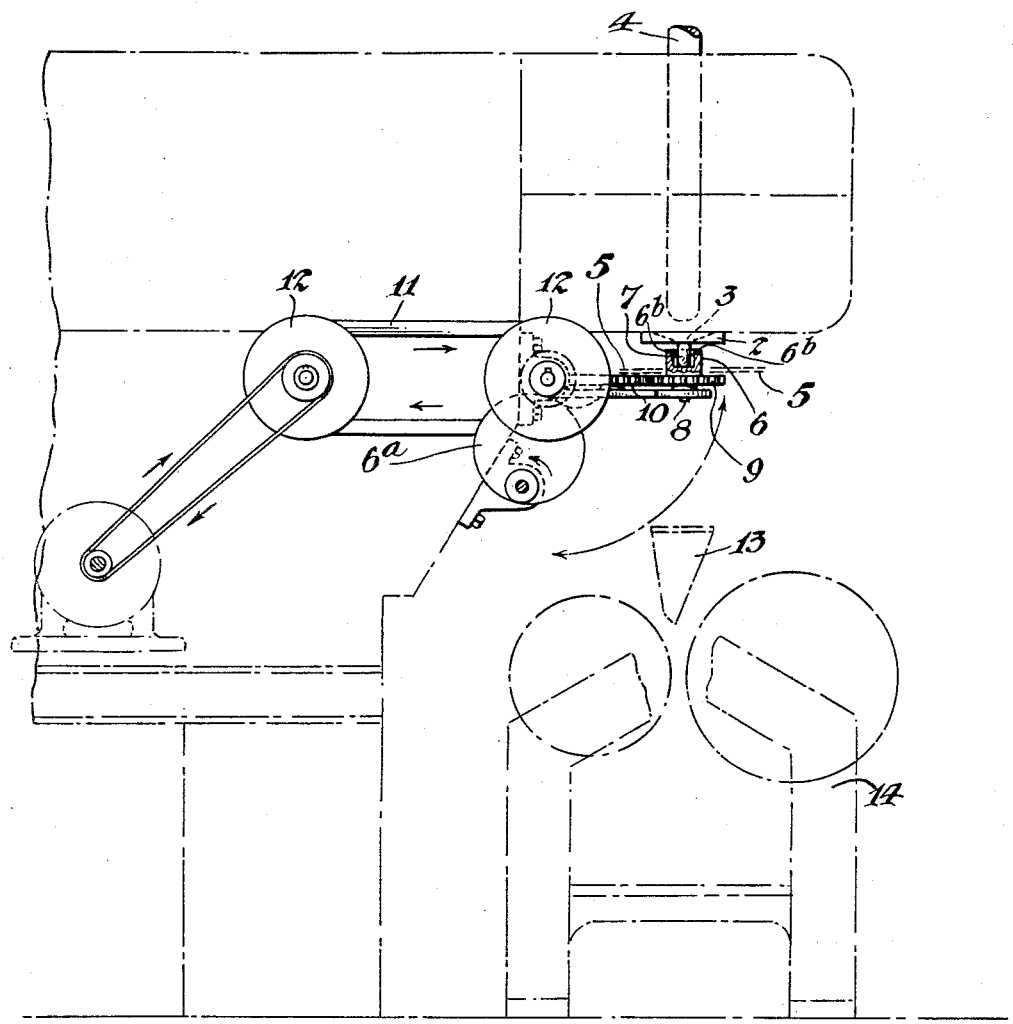
Figure 2:
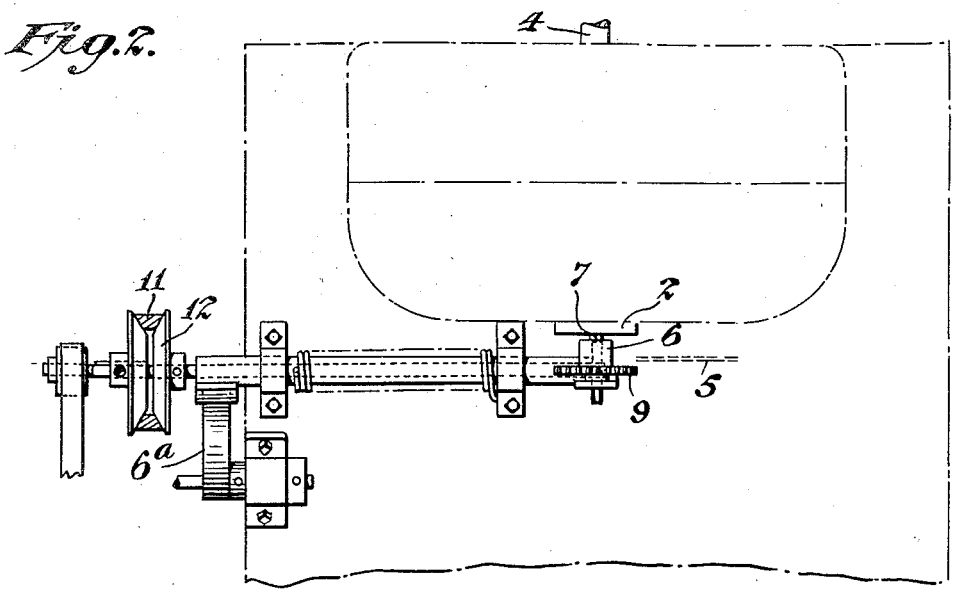
Figure 3:
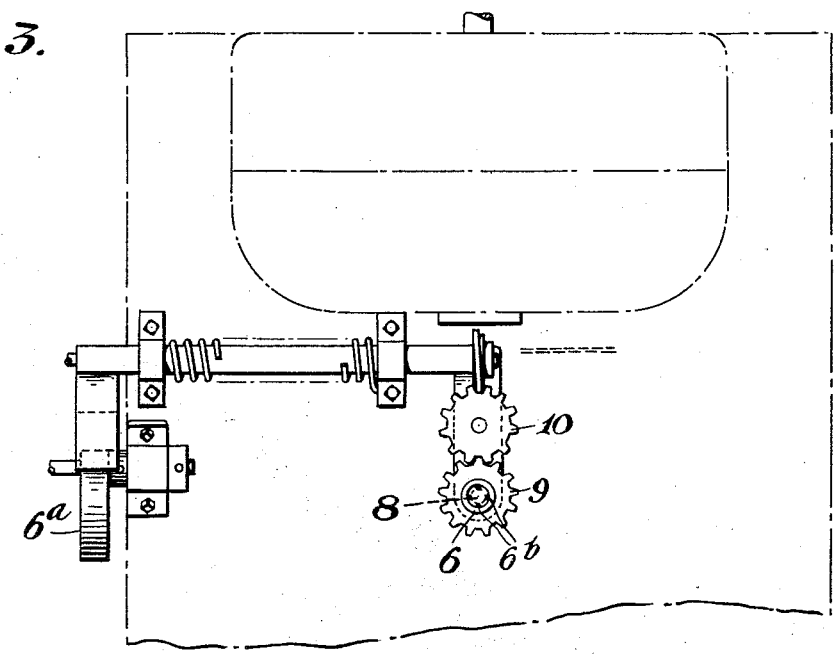

In the accompanying drawings, Fig. 1 is an elevation, partly in section, of apparatus for carrying out my invention; Fig. 2 is a front elevation thereof with the receptacle in supporting position; and Fig. 3 is similar to Fig. 2, with the receptacle in non-supporting position.

I have shown in the drawings a typical way of carrying out my invention. The molten glass, in which glass of two or more colors has previously been combined, is flowed out of a boot or spout 2 of a furnace through an orifice 3 of the usual character, in which the flow of glass is controlled by a plunger 4, which may be stationary, or reciprocated or rotated, as desired. After the glass flowing down through the orifice has been cut by the usual shears 5, I provide a means 6 for supporting and elevating the stub end 7 of the glass above the shears, which tends to eliminate the shear mark left by the action of the shears 5 on the stub 7.

The means 6 for supporting the glass preferably consists in a refractory cup-shaped receptacle which may be elevated from the one side and beneath the shears 5 as the shears open, and passed, as by a suitable reciprocating means such as the driven cam $6^a$, upwardly between the open shears to engage and support the bottom of the stub 7, and thus cause the stub end to assume the shape of the receptacle 6. This shaping is preferably accelerated by the elevation of the stub by the receptacle, which assists in obliterating the shear mark from the stub end.

As the glass is thus supported by the receptacle 6 I prefer to give it a rotary or twisting motion, which tends to rotate the stub 7 and thereby give the desired striping effect to the different colors of glass which are contained in the gob being formed from the stub end. The rotation of the stub is assisted by slight projections $6^b$ on the interior of the cup which give a positive engagement with the stub.

This rotary or twisting movement may be effected by driving the shaft 8, on which the receptacle 6 is mounted, by means of the gears 9 and 10, the belt 11 and the variable speed pulleys 12.

While the supporting and twisting action of the receptacle is only momentary, as the shears normally operate at about thirty closures per minute, it is sufficient to change the form of the stub or bottom of the succeeding charge or gob and to draw the added color or colors into well defined bands or stripes. The cup is then withdrawn down between the shears, the gob drops down through and is cut by the shears and falls into the funnel 13 and thence into the forming machine 14.

I have found that my invention is of great advantage not only in the elimination of shear marks and in striping parti-colored glass, but also in giving a variety of striping to the marbles and glass balls, which is so desired in the commercial product. The use of a variable speed motor for causing the rotation of the receptacle is also of advantage, since it assists in getting this variable striped effect, which is also assisted by the amount of lift given to the stub end of the glass by the receptacle.

It is obvious that the plunger, shears, receptacle, funnel and forming mechanism are to be operated in timed relation.

The terms and expressions which I have employed are used as terms of description and not of limitation, and I have no intention, in the use of such terms and expressions, of excluding any equivalents of the features shown and described, or portions thereof, but recognize that various modifications are possible within the scope of the invention claimed.

What I claim is:
1. The method of feeding molten glass which comprises causing discharge of glass from a source of supply through a downwardly opening discharge outlet to form a charge mass in free suspension from said outlet, applying an undersupport temporarily to said suspended charge mass and twisting said mass while thus supported, removing the undersupport from all the twisted glass below said discharge outlet to permit such glass to sag downwardly in response to the action of gravity, and severing a charge from the glass below said discharge outlet when a portion thereof sufficient for the charge desired has passed downwardly below the plane of severance.

2. Glass feeding apparatus comprising a container having a downwardly opening discharge outlet through which molten glass may issue in a suspended mass, means for temporarily engaging glass of said suspended mass and for twisting said glass with respect to glass in said outlet, means for withdrawing said glass engaging means from engagement with all portions of the mass of discharged glass below said discharge outlet, and means for severing a charge from said mass of discharged glass.

3. Glass feeding apparatus comprising a container having a discharge outlet in its base, a cup mounted to swing periodically from an out-of-the-way position to position to engage the lower end portion of glass issuing from said outlet, means for moving said cup periodically to and from its glass engaging position, means for rotating said cup substantially about its axis when it is in its glass engaging position, and periodically acting severing means for severing charges from the issuing glass in the intervals between the glass engaging operations of said cup.

4. In apparatus for feeding molten glass, means for flowing the molten glass through a final discharge orifice, shears for separating the glass below the orifice in the form of gobs, a receptacle, means for reciprocating the receptacle in timed relation to the shears to and from position to support successive charges of glass momentarily above the shearing plane, and variable speed means for rotating said receptacle about its own axis while it is in supporting relation to glass beneath the orifice.

5. In apparatus for feeding molten glass, means for flowing the molten glass through an orifice, shears for separating the glass in the form of gobs, a receptacle, means for reciprocating the receptacle in timed relation to the shears initially to lift and temporarily to support the lower end portion of each of successive charges of glass momentarily above the shearing plane, and means for rotating the receptacle to cause the successive charges to rotate to effect striping of the glass.

6. The method of feeding molten glass in variegated charges, comprising the steps of feeding glass of a plurality of different colors through a final discharge outlet, temporarily engaging a portion of each mass of glass issuing from the final discharge outlet and twisting such glass to distribute the colors therein, and then severing a charge from said issued glass.

7. Glass feeding apparatus comprising a container having a discharge outlet in its base, a cup mounted to swing periodically from an out of the way position to position to engage the lower end portion of glass issuing from said outlet, means for moving said cup periodically to and from its glass engaging position, and means for rotating said cup substantially about its axis when it is in its glass engaging position.

8. Glass feeding apparatus comprising a container having a discharge outlet in its base, a cup mounted to swing periodically from an out of the way position to position to engage the lower end portion of glass issuing from said outlet, means for moving said cup periodically to and from its glass engaging position, means for rotating said cup substantially about its axis when it is in its glass engaging position, and means for varying the speed of rotation of said cup.

9. The method of obtaining variegated charges of molten glass which comprises causing molten glass of a plurality of different colors to issue from a final discharge outlet in successive suspended masses, temporarily mechanically engaging the lower end portion of each of said masses and imparting a lifting movement to such glass at the beginning of the period of formation thereof, imparting a rotary motion to said glass to distribute the colors thereof, controlling the distribution of such colors in said masses by varying the extent of lifting movement and the speed of rotary motion imparted thereto, and severing each mass, when formed, at a plane spaced below said discharge outlet.

In testimony whereof, I have signed my name to this specification this 18th day of July, 1928.

GILBERT C. MARSH.